(12) United States Patent
Rosberg et al.

(10) Patent No.: US 7,827,580 B2
(45) Date of Patent: Nov. 2, 2010

(54) DYNAMICALLY ADJUSTABLE ELECTRONIC SERVICE GUIDE

(75) Inventors: Kristian Rosberg, Helsinki (FI); Arto Kiiskinen, Espoo (FI); Martin Jansky, Espoo (FI)

(73) Assignee: Nokia Corporation, Espoo (FI)

(*) Notice: Subject to any disclaimer, the term of this patent is extended or adjusted under 35 U.S.C. 154(b) by 302 days.

(21) Appl. No.: 11/615,194

(22) Filed: Dec. 22, 2006

(65) Prior Publication Data

US 2008/0155596 A1    Jun. 26, 2008

(51) Int. Cl.
*H04N 7/16* (2006.01)
*G06F 13/00* (2006.01)

(52) U.S. Cl. .............. 725/62; 725/38; 725/39; 725/89; 725/68; 725/85; 725/100; 725/131; 725/150; 455/452.1

(58) Field of Classification Search .......... 725/37–61, 725/62, 85, 89, 100, 110, 131, 139, 151; 455/464, 452.1
See application file for complete search history.

(56) References Cited

U.S. PATENT DOCUMENTS

| | | | |
|---|---|---|---|
| 5,038,211 A | | 8/1991 | Hallenbeck |
| 5,652,613 A | * | 7/1997 | Lazarus et al. ............... 725/50 |
| 7,533,399 B2 | * | 5/2009 | Ma et al. ..................... 725/46 |
| 2003/0051244 A1 | * | 3/2003 | Klopfenstein ................ 725/46 |
| 2005/0193413 A1 | * | 9/2005 | Ellis et al. ................... 725/45 |
| 2005/0283807 A1 | * | 12/2005 | Lee et al. ..................... 725/62 |
| 2006/0053450 A1 | * | 3/2006 | Saarikivi et al. .............. 725/46 |

FOREIGN PATENT DOCUMENTS

WO     9925119 A1     5/1999

OTHER PUBLICATIONS

International Search Report from International Application No. PCT/IB2007/004014 dated Feb. 20, 2009, 4 pages.
Digital Video Broadcasting (DVB); IP Datacast over DVB-H: Electronic Service Guide (ESG) European Broadcasting Union, ETSI TS 102 471, V1.2.1, Nov. 1, 2006.
International Preliminary Report on Patentability for corresponding PCT Application No. PCT/IB2007/004014 dated Jul. 2, 2009, pp. 1-12.

* cited by examiner

*Primary Examiner*—Christopher Kelley
*Assistant Examiner*—Alazar Tilahun
(74) *Attorney, Agent, or Firm*—Ditthavong Mori & Steiner, P.C.

(57) ABSTRACT

Embodiments of the invention are directed to allocating mobile-terminal electronic-service-guide (ESG) memory for use in storing a dynamically adjustable ESG, determining a composition of a dynamically adjustable ESG that can be stored in the allocated mobile-terminal ESG memory, and determining whether ESG fragments are deleted from the dynamically adjustable ESG to reduce the size of the dynamically adjustable ESG. The size of the allocated ESG memory may be determined based on an amount of memory dynamically available in a mobile terminal and/or by checking statistics of previously stored and/or received ESG data. A time-filter value may be determined for use in determining whether particular ESG fragments should be stored in the dynamically adjustable ESG. The time-filter value may be determined based on a number of channels (or services) for which ESG fragments will be stored in the dynamically adjustable ESG and/or based on whether an ESG-memory-usage threshold has been exceeded.

34 Claims, 11 Drawing Sheets

DYNAMICALLY ADJUSTABLE ELECTRONIC SERVICE GUIDE

TECHNICAL FIELD

Embodiments of the invention relate to electronic service guide information.

BACKGROUND

Digital broadband broadcast networks enable end users to receive digital content including video, audio, data, and so forth. Using a mobile terminal, a user may receive digital content over a wireless digital broadcast network. Digital content can be transmitted wirelessly using packetized transmission, such as provided for example by the MPEG-TS (Moving Pictures Experts Group Transport Stream) standard.

There are several broadcast services available. For example, 3GPP (Third-generation Partnership Project) provides broadcast services in Global System for Mobile Communications/Wideband CDMA (GSM/WDCMA) and 3GPP2 (Third-generation Partnership 2) provides broadcast services in CDMA2000. The work item in GSM/WCDMA is Multimedia Broadcast and Multicast Service (MBMS). The work item in CDMA2000 is Broadcast and Multicast Service (BCMCS).

In addition to MBMS of 3GPP and BCMCS of 3GPP2, Open Mobile Alliance (OMA) BCAST, a sub-working group for mobile broadcast services, provides OMA BCAST services such as content protection, service guides, program guides, or transmission scheduling for an underlying broadcast service such as MBMS, BCMCS or digital broadband broadcast systems such as DVB-H (Digital Video Broadcasting handheld).

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

Embodiments of the invention are directed to allocating mobile-terminal electronic-service-guide (ESG) memory for use in storing a dynamically adjustable ESG, determining a composition of a dynamically adjustable ESG that can be stored in the allocated mobile-terminal ESG memory, and determining whether ESG fragments are deleted from the dynamically adjustable ESG to reduce the size of the dynamically adjustable ESG. The size of the allocated ESG memory may be determined based on an amount of memory dynamically available in a mobile terminal and/or by checking statistics of previously stored and/or received ESG data. A time-filter value may be determined for use in determining whether particular ESG fragments should be stored in the dynamically adjustable ESG. The time-filter value may be determined based on a number of channels (or services) for which ESG fragments will be stored in the dynamically adjustable ESG and/or based on whether an ESG-memory-usage threshold has been exceeded.

Additional features of the invention will be apparent upon reviewing the following detailed description.

BRIEF DESCRIPTION OF THE DRAWINGS

The foregoing summary of the invention, as well as the following detailed description of various embodiments, is better understood when read in conjunction with the accompanying drawings, which are included by way of example, and not by way of limitation with regard to the claimed invention.

DETAILED DESCRIPTION

In the following description of the various embodiments, reference is made to the accompanying drawings, which form a part hereof, and in which is shown by way of illustration various embodiments in which the invention may be practiced. Other embodiments may be utilized and structural and functional modifications may be made without departing from the scope and spirit of the invention.

The following is separated by subheadings for the benefit of the reader. The subheadings include: introduction, illustrative operating environments, and program guide browser.

I. Introduction

Electronic service guide (ESG) information may contain information about digital mobile services available in a given Internet Protocol (IP) platform. Mobile terminals typically have a limited amount of memory, which means that a limited amount of memory will be available for storing an electronic service guide (ESG) in a mobile terminal. Further, an amount of memory available for storing ESG information may change dynamically during use of the mobile terminal. As such, improved techniques for determining how much ESG data a mobile terminal should store would be desirable.

In accordance with an embodiment of the invention, an approximate platform size may be estimated. The number of services in a platform typically corresponds reasonably well to an amount of ESG data for the platform. As such, when a platform has relatively more services, ESG data for a relatively shorter period of time may be stored, and when the platform has relatively fewer services, ESG data for a relatively longer period of time may be stored. For example, suppose a platform includes ten services, then three days of ESG information may be stored in a dynamically adjustable ESG in accordance with embodiments of the invention. If, on the other hand, the platform has only five services, then six days of ESG information may be stored in a dynamically adjustable ESG in accordance with embodiments of the invention.

ESG information may be filtered (i.e., removed) from downloaded ESG information and/or from ESG information stored in a mobile terminal based on time-based conditions and/or based on the type of content of a piece of ESG information. For example, ESG information including, but not limited to, ESG information containing images, ESG information for time slots that are too far in the future, and non-critical ESG information, may be filtered from a dynamically adjustable ESG in accordance with embodiments of the invention.

In accordance with various embodiments of the invention, a mobile terminal may allocate a fixed, or variable, amount of memory for storing ESG information.

II. Illustrative Operating Environments

Figure 1:
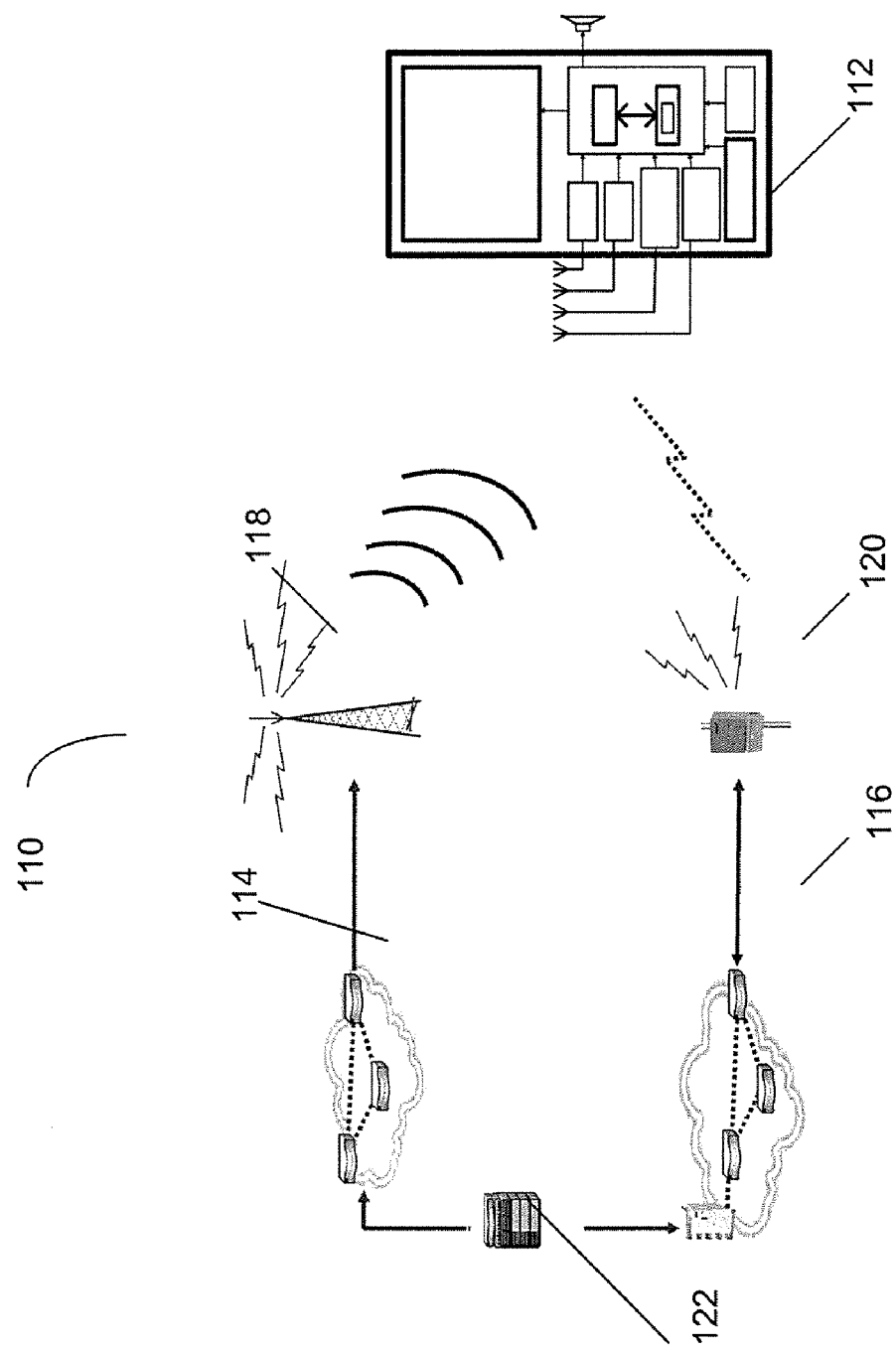
FIG. 1 illustrates a block diagram of a wireless communication system in which various aspects of the invention may be implemented.

Embodiments of the invention may be utilized across a broad array of networks and communication protocols. FIG. 1 illustrates an example of a wireless communication system 110 in which systems and methods in accordance with the invention may be employed. One or more network-enabled mobile devices 112, such as a personal digital assistant (PDA), cellular telephone, mobile terminal, personal video recorder, portable television, personal computer, laptop computer, digital camera, digital camcorder, portable audio/video device, portable radio, positioning device (like a global positioning system (GPS) device), or any combinations thereof, are in communication with a service source 122 through a broadcast network 114 and/or cellular network 116. The mobile terminal/device 112 may comprise a digital broadcast receiver device. The service source 122 may be connected to several service providers that may provide their actual program content or information or description of their services and programs to the service source that further provides the content or information to the mobile device 112. The several service providers may include, but are not limited to, one or more television and/or digital television service providers, AM/FM radio service providers, SMS/MMS push service providers, Internet content or access providers.

The broadcast network 114 may include a radio transmission of IP datacasting over DVB-H. The broadcast network 114 may broadcast a service such as a digital or analog television signal and supplemental content related to the service via transmitter 118. The broadcast network may also include a radio, television or IP datacasting broadcasting network. The broadcast network 114 may also transmit supplemental content which may include a television signal, audio and/or video streams, data streams, video files, audio files, software files, and/or video games. In the case of transmitting IP datacasting services, the service source 122 may communicate actual program content to user device 112 through the broadcast network 114 and additional information such as user right and access information for the actual program content through the cellular network 116.

The mobile device 112 may also contact the service source 122 through the cellular network 116. The cellular network 116 may comprise a wireless network and a base transceiver station transmitter 120. The cellular network may include a second/third-generation (2G/3G) cellular data communications network, a Global System for Mobile communications network (GSM), a Universal Mobile Telecommunications System (UMTS) or other wireless communication network such as a WLAN network.

In one aspect of the invention, mobile device 112 may comprise a wireless interface configured to send and/or receive digital wireless communications within cellular network 116. The information received by mobile device 112 through the cellular network 116 or broadcast network 114 may include user selection, applications, services, electronic images, audio clips, video clips, and/or WTAI (Wireless Telephony Application Interface) messages. As part of cellular network 116, one or more base stations (not shown) may support digital communications with receiver device 112 while the receiver device is located within the administrative domain of cellular network 116.

Figure 2:
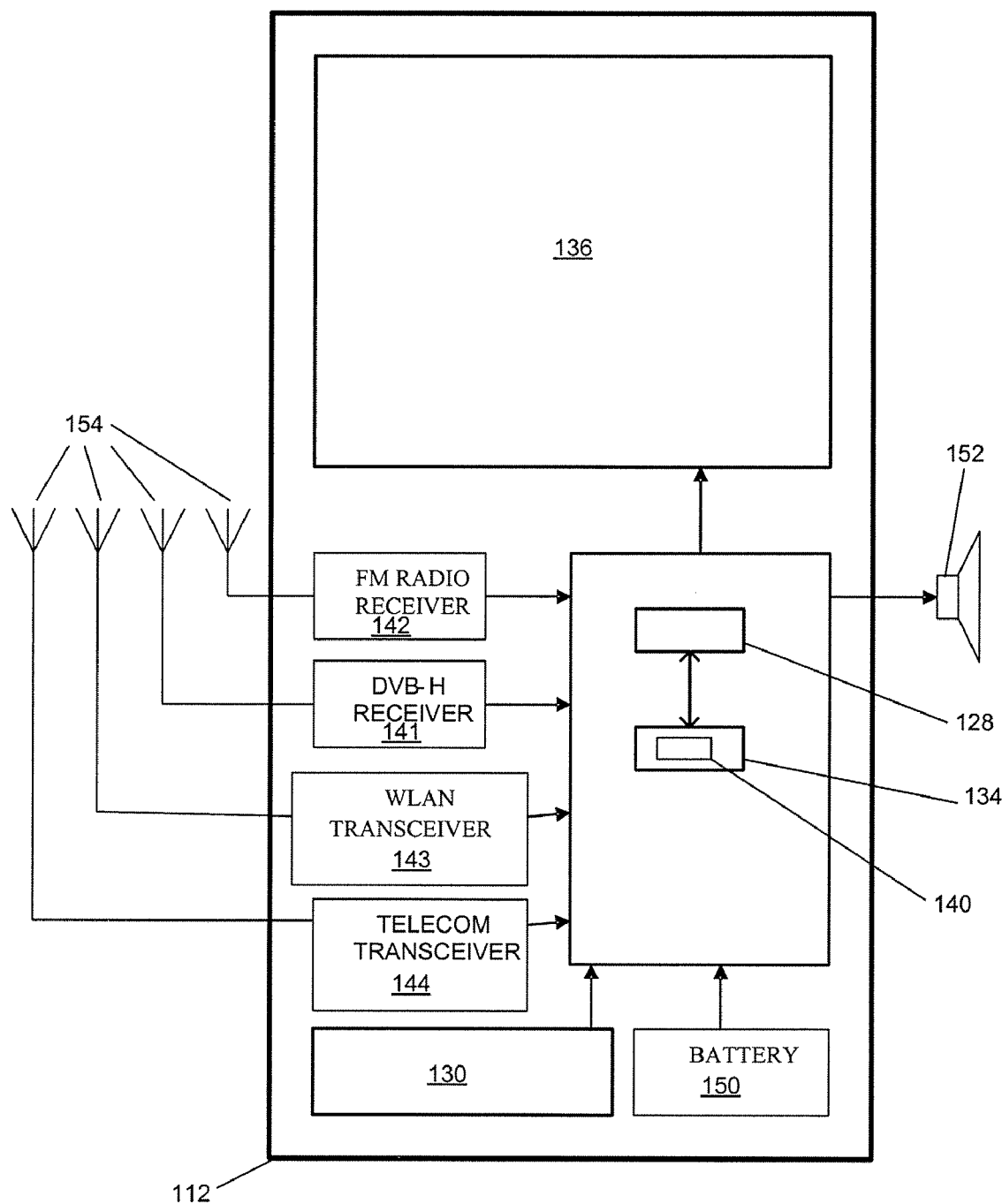
FIG. 2 illustrates a block diagram of a mobile terminal in accordance with an aspect of the invention.

As shown in FIG. 2, mobile device 112 (also referred to as a mobile terminal) may include processor 128 connected to user interface 130, memory 134 and/or other storage, and display 136. Mobile device 112 may also include battery 150, speaker 152 and antennas 154. User interface 130 may farther include a keypad, touch screen, voice interface, four arrow keys, joy-stick, data glove, mouse, roller ball, touch screen, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory, wherein some of the memory modules may be detachable. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to receive, decode and process digital broadband broadcast transmissions that are based, for example, on the Digital Video Broadcast (DVB) standard, such as DVB-H or DVB-MHP, through a specific DVB receiver 141. The mobile device may also be provided with other types of receivers for digital broadband broadcast transmissions. Additionally, receiver device 112 may also be configured to receive, decode and process transmissions through FM/AM Radio receiver 142, WLAN transceiver 143, and telecommunications transceiver 144. Further the mobile device may be configured to receive transmissions based on the Digital Audio Broadcasting (DAB) standard (not shown). In one aspect of the invention, mobile device 112 may receive radio data stream (RDS) messages.

In an example of the DVB standard, one DVB 10 Mbit/s transmission may have 200 50-kbit/s audio program channels or 50 200-kbit/s video (TV) program channels. The mobile device 112 may be configured to receive, decode, and process transmission based on the Digital Video Broadcast-Handheld (DVB-H) standard or other DVB standards, such as DVB-MHP, DVB-Satellite (DVB-S), DVB-Terrestrial (DVB-T) or DVB-Cable (DVB-C). Similarly, other digital transmission formats may alternatively be used to deliver content and information of availability of supplemental services, such as ATSC (Advanced Television Systems Committee), NTSC (National Television System Committee), ISDB-T (Integrated Services Digital Broadcasting-Terrestrial), DAB (Digital Audio Broadcasting), DMB (Digital Multimedia Broadcasting), FLO (Forward Link Only) or DIRECTV. Additionally, the digital transmission may be time sliced, such as in DVB-H technology. Time-slicing may reduce the average power consumption of a mobile terminal and may enable smooth and seamless handover. Time-slicing consists of sending data in bursts using a higher instantaneous bit rate as compared to the bit rate required if the data were transmitted using a traditional streaming mechanism. In this case, the mobile device 112 may have one or more buffer memories for storing the decoded time sliced transmission before presentation.

Information regarding available services may be transmitted to a subscriber terminal or receiver within an Electronic Service Guide (ESG). Thus, an ESG may enable a terminal to communicate what services are available to end users and how the services may be accessed. ESG fragments are independently existing pieces of the ESG. Traditionally, ESG fragments comprise XML documents, but more recently they have encompassed a vast array of items, such as for example, a SDP (Session Description Protocol) description, textual file, or an image. The ESG fragments describe one or several aspects of currently available (or future) service or broadcast programs. Such aspects may include for example: free text description, schedule, geographical availability, price, purchase method, genre, and supplementary information such as preview images or clips. Audio, video and other types of data comprising the ESG fragments may be transmitted through a variety of types of networks including wireless digital broadband broadcast networks according to many different protocols. For example, data can be transmitted through a collection of networks usually referred to as the "Internet" using protocols of the Internet protocol suite, such as Internet Protocol (IP) and User Datagram Protocol (UDP). ESG fragments may also be transmitted by using ALC and FLUTE protocols. Data is often transmitted through the Internet addressed to a single user. It can, however, be addressed to a group of users, commonly known as multicasting. In the case in which the data is addressed to all users it is called broadcasting.

ESG fragments include metadata and descriptions of services or content and are instantiated using a syntax such as XML. Identifiers are used to identify the ESG fragments regarding various attributes of the ESG fragments. However, these identifiers often create large overhead due to their large size. For example, if a Uniform Resource Identifier (URI) is used as an identifier, the overhead is large and unwieldy at 255*8. Therefore, short 32-bit integer identifiers have been used to identify ESG fragments. However, identifiers must be unique for each corresponding ESG fragment. Administration of 32-bit integer identifiers would need to be globally centralized in order to provide the necessary uniqueness of the identifier because ESG fragments from different sources may be identified by non-unique identifiers. For example, as ESG fragments are often aggregated from different sources, each source may not use a standard identifier scheme such that there may be conflicts of identifiers among different sources. In this example, different sources may use the same identifier for corresponding ESG fragments from the different sources. When the different ESG fragments from different source with the same identifier are received at the aggregator, conflicts will arise.

Figure 3:
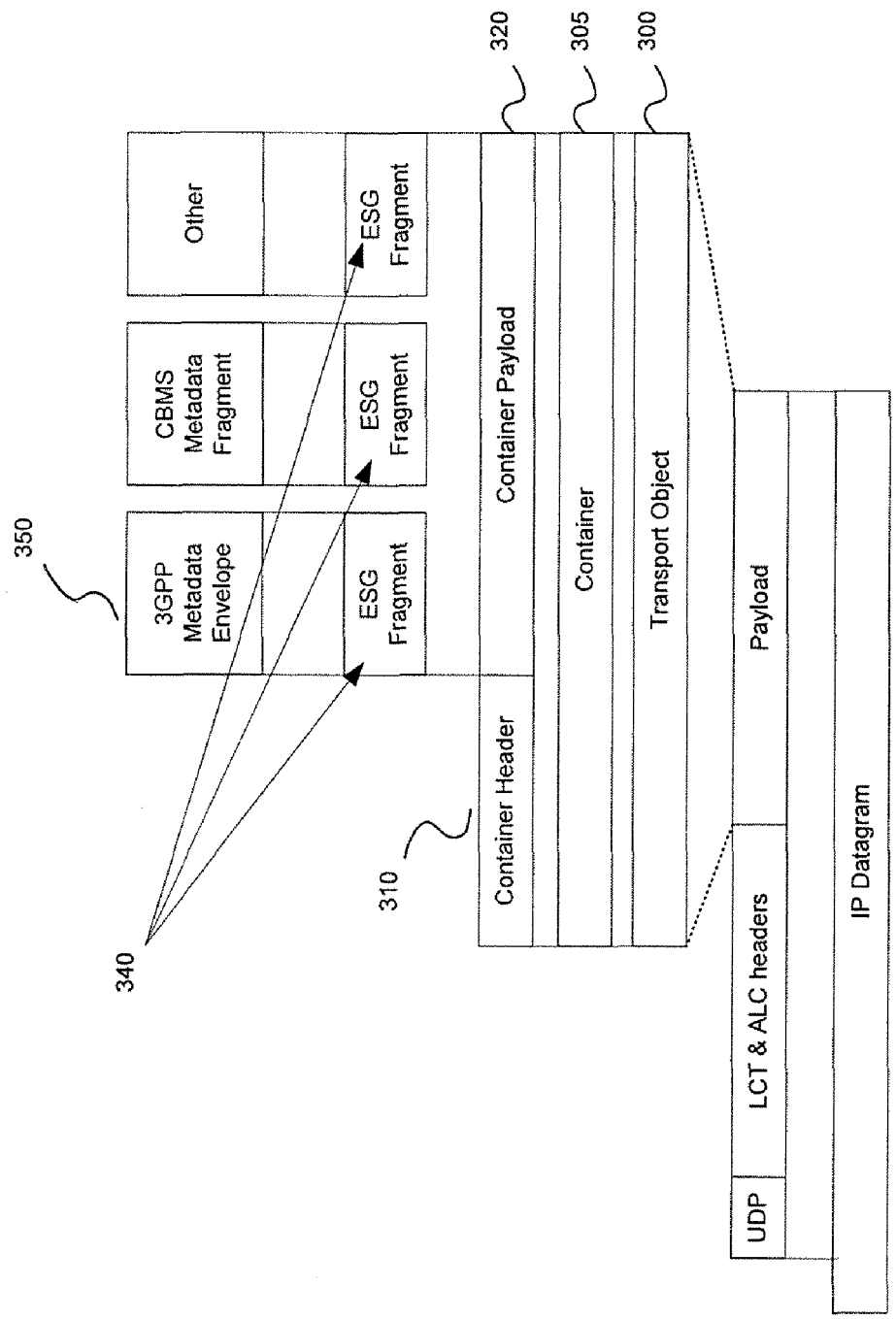
FIG. 3 illustrates a schematic diagram of an example transport object in accordance with an aspect of the invention.

FIG. 3 is a schematic diagram of an example transport object in accordance with at least one aspect of the present invention. Generally, a single transport object 300 comprises a container header 310 and a container payload 320. By incorporating the header 310 and the payload 320 into a single transport object 300, there is no longer a need to recombine each header with the information regarding where each container is located within different transported objects. Furthermore, there is no longer an issue of which to transmit first, as presented in previous systems. The container header 310 may contain configuration information regarding the header and/or the container payload 320. In one embodiment, the header 310 is coded to inform a receiver of the entry length of the header.

In an embodiment, the header 310 may have a plurality of ESG fragment descriptor entries 330 that identify the ESG fragments 340 in the container payload 320 so that the receiver may determine the exact position and/or length of each contained ESG fragment 340. For example, in one embodiment, a field specifies where the particular ESG begins within the container payload 320 by providing, for example, an offset value, start and end points, or the like. In other embodiments, metadata 350 may be associated with the individual ESG fragments 340, located within or proximate to the header 310, descriptor entries 330, an ESG fragment 340 or a mixture thereof. In one exemplary embodiment, the association of a 3GPP metadata envelope with an ESG fragment 340 may substitute, or negate the need, for additional metadata to be located in the header 310 in relation to that particular ESG fragment.

Figure 4:
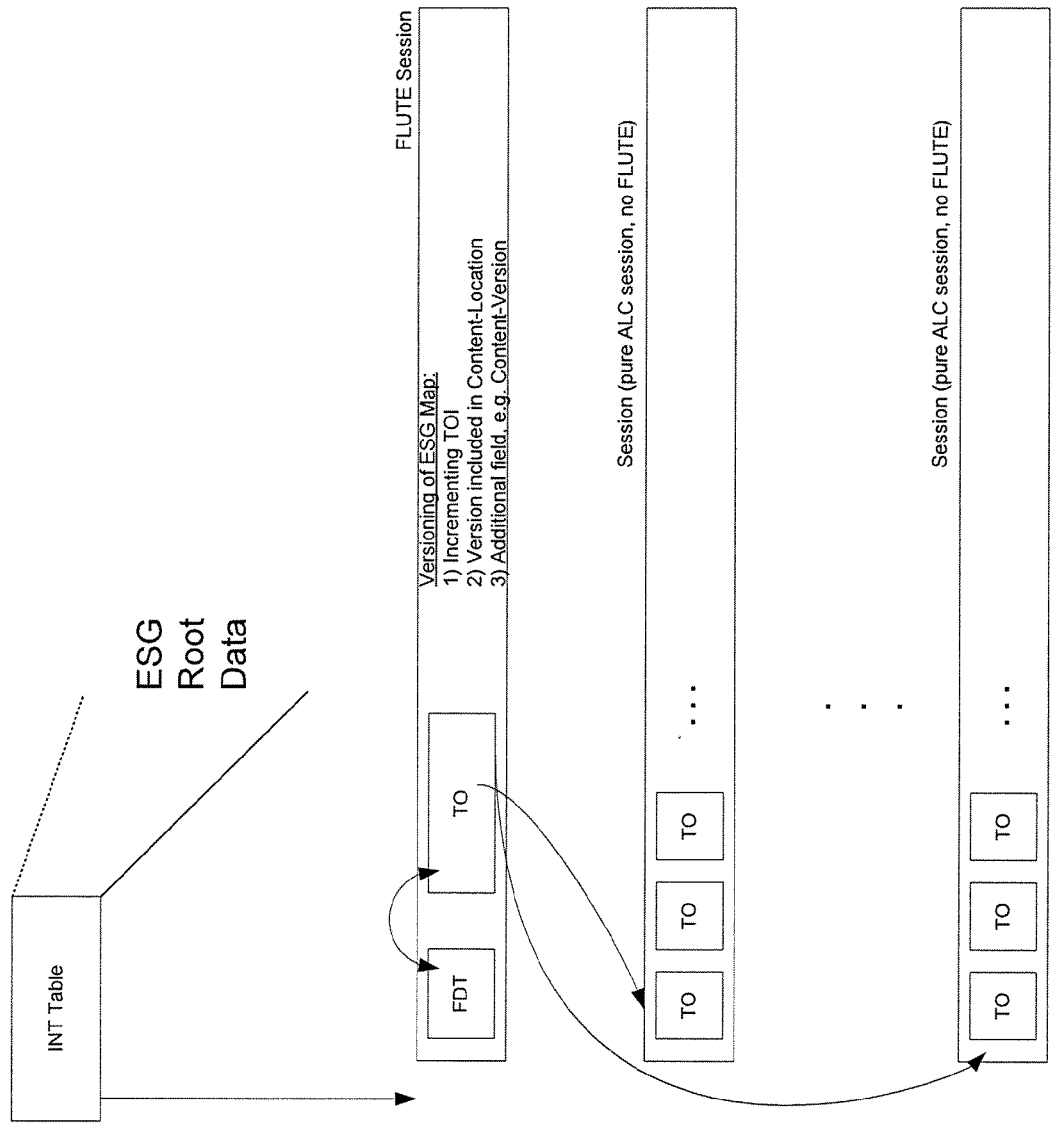
FIG. 4 illustrates an example of transmitting a plurality of single Transport Objects in accordance with an aspect of the invention.

FIG. 4 illustrates an example of transmitting a plurality of single Transport Objects. As illustrated in FIG. 4, the Transport Objects (TO) of the current invention may be carried in, for example, FLUTE (File Delivery over Unidirectional Transport) sessions, or a pure Asynchronous Layered Coding (ALC) session. In the example of FIG. 4, the ESG Root Channel data, such as IP Address, port number and Transport Session Identifier (TSI), are announced in the IP/MAC Notification Table (INT Table) which may be, for example, carried in the SI/PSI stream in DVB-H as one of the SI tables of DVB-H. The FLUTE session of the ESG Root Channel comprises a File Delivery Table (FDT) of the session and one or more Transport Objects (TO). These Transport Objects that may be delivered in announcement carousels contain mapping between the different parts of ESGs and access parameters to the different ESG methods in which the ESG data is transmitted. The ESGs may differ from each other. For example, ESGs may be in different languages, genres or encoding.

Examples of access parameters may include, for example, IP Addresses, port numbers, TSIs, start and end times etc. The FLUTE session thus declares how the ESG data is distributed to different sessions. The TOs of the FLUTE session carrying this mapping data are described in the FDT of the FLUTE session. The ESG mapping data may be delivered in one or multiple TOs. The mapping can be made using XML Schema, plain ASCII text, Structured ASCII text such as multipart MIME or MIME headers, as binary with enumerated types or through various other means as is known in the art. The ESG data in this example may be delivered in one or more TOs, which may be within pure ALC sessions, for example. The ESG data or parts of it may be delivered in some embodiments of the invention in one or more FLUTE sessions in addition to or instead of ALC sessions.

III. Dynamically Adjustable Electronic Service Guide

Figure 5:
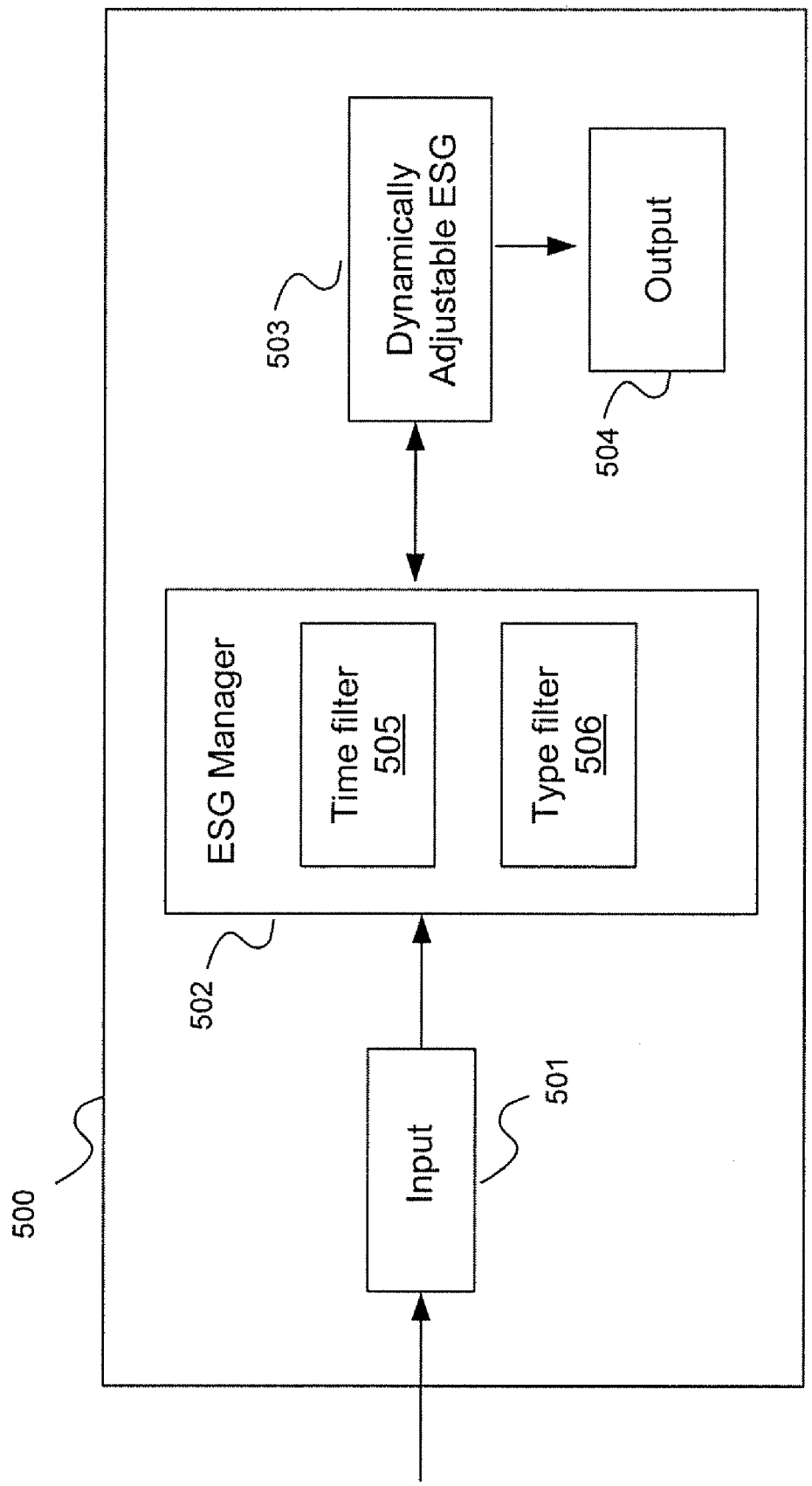
FIG. 5 is a schematic diagram of a mobile terminal in accordance with embodiments of the invention.

FIG. 5 is a schematic diagram of a mobile terminal in accordance with embodiments of the invention. An ESG manager 502 receives downloaded ESG fragments from an input 501. The ESG manager contains a time filter 505 and a type filter 506, which filter ESG fragments (i.e., remove them or cause them not to be stored) from a dynamically adjustable ESG 503. The dynamically adjustable ESG 503 may transfer stored ESG information to an output 504, which may cause the ESG information transferred to the output 504 to be displayed to a mobile-terminal user.

When a list of ESG fragments for downloading to, and storage by, a mobile terminal is built, a determination may be made with respect to whether there have any changes to the list of ESG fragments relative to ESG fragments already downloaded and stored.

Accordingly, a case that occurs relatively frequently is that in the ESG update, which may occur periodically, such as every 2 hours) there are no changes, relative to previous ESG information, in the ESG information currently being broadcast. Under such circumstances, the ESG manager does not cause the ESG information currently being broadcast to be stored.

Another case that occurs is that one day's worth of ESG information is deleted and then a new day's worth of ESG information is stored. Yet another situation occurs when there is a change in one or more ESG items that have already been stored. Under these circumstances, the ESG manager downloads and stores the changed item.

In general, ESG information may be stored when the ESG Manager recognizes that it has received updated ESG data, i.e. one or more updated ESG fragments, relative to the ESG data that is already stored in the user terminal 112. Storing the updated ESG data may result in usage of more (or less) memory relative to the amount of memory previously used for storing the ESG data.

In accordance with an embodiment of the invention, a user may select or set as a default a more general ESG display, which would result in less program information being displayed with a particular ESG listing (e.g., no pictures, descriptions, etc.) and ESG listings covering a relatively longer duration being displayed. On the other hand, a user may select a more detailed ESG display in which more program information would be displayed with a particular ESG listing (e.g., pictures, descriptions, etc.) and ESG listings covering a relatively shorter duration would be displayed.

In accordance with various embodiments of the invention, a mobile terminal may allocate a fixed, or variable, amount of memory for storing ESG information.

A. Static Memory

Information about the size of ESG fragments and/or a group of ESG fragments may not be known before ESG fragments are downloaded to, and stored in, a mobile terminal. It may be possible to statistically estimate a size of an ESG based on previously stored sizes, or received size, of ESG data from an ESG memory log. ESG fragments may come in random order, and the size of one day of ESG information may not be known before the ESG information is downloaded to, and stored in, a mobile terminal.

An amount of a mobile terminal's memory that is available varies with time. An ESG's size also varies with time. But, by reserving a configurable amount of ESG storage space in a mobile terminal, a mobile terminal will be able to store ESG information for a particular duration (e.g., 3 days).

An ESG manager, in accordance with an embodiment of the invention, follows a state of the mobile terminal's memory and, in case memory allocation reaches 80%, the ESG manager may cause the ESG information to be filtered from a dynamically adjustable ESG stored on the mobile terminal.

An ESG manager, in accordance with an embodiment of the invention, monitors storage capacity during ESG update operations and may cause ESG filter settings to be adjusted. For example, the timeframe (e.g., number of days) may be adjusted for which ESG fragments are currently being stored in the dynamically adjustable.

If the ESG memory usage monitor detects that a memory usage threshold (e.g., 80% ESG memory usage) has been exceeded, for example, because complete information for a selected duration (e.g. 3 days worth of ESG information) cannot be stored, various types of ESG fragments may be filtered from a dynamically adjustable ESG. For example, program descriptions, interactive services, images, and the like, may be filtered from the dynamically adjustable ESG. Various priorities may be assigned to different types of ESG data for specifying which types of ESG data should be deleted before or after other types of ESG data.

Figure 6:
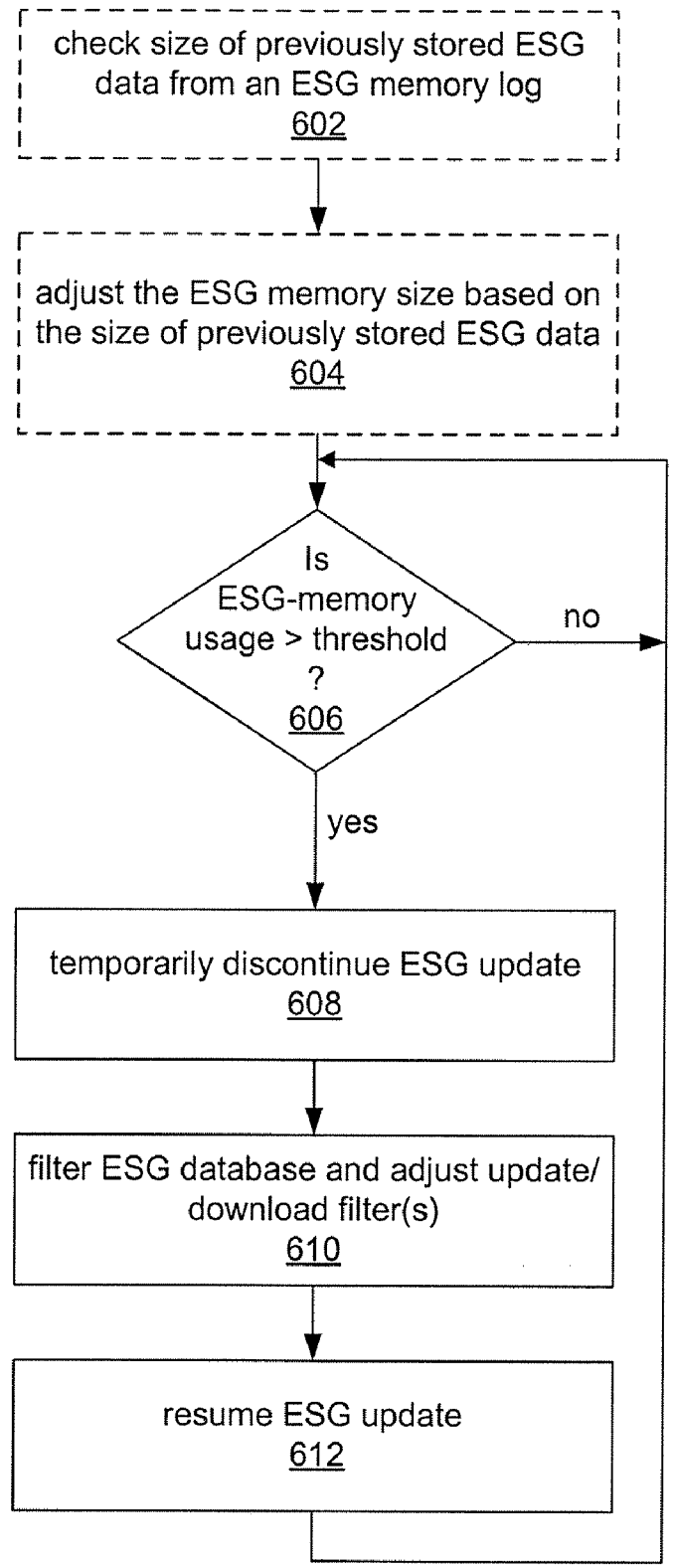
FIG. 6 shows steps performed by an ESG manager in accordance with embodiments of the invention.

FIG. 6 shows steps performed by an ESG manager in accordance with one exemplary embodiment of the invention. A first optional step, as shown at 602, is checking the size of previously stored ESG data from an ESG log. A second optional step, as shown at 604, is adjusting the ESG memory size based on the size of previously stored ESG data. While ESG fragments are being downloaded to the mobile terminal and stored in the dynamically adjustable ESG, a determination is made as to whether a first ESG-memory-usage threshold (e.g., 80% of ESG memory in use) has been exceeded, as shown in 606. If the threshold has been exceeded, downloading and storing (also referred to as updating) of the dynamically adjustable ESG is temporarily discontinued, as shown at 608. ESG fragments are then filtered (i.e., removed from the dynamically adjustable ESG) and one or more update/download filters are adjusted to exclude more ESG fragments than before, during update/download of ESG fragments, from the dynamically adjustable ESG as shown at 610. Updating of the dynamically adjustable ESG then resumes, with the one or more adjusted filters, as shown at 612. Steps 606 through 612 may continue looping as long as is desired or until a minimum level of ESG data is downloaded. Additionally, the ESG manager may set multiple levels of threshold values, e.g. 60%, 80% and 90% of the ESG memory, and each threshold value may have its own associate filter definitions and/or its own associated set of filters. The various filter definitions may differ from one another in whole or in part. Similarly, the various sets of filters may differ from one another in whole or in part.

A platform-information count may be generated by multiplying time, such as in days or hours, by the number of services. When the ESG manager can determine a data-storage size associated with a certain period of time for the channels/services of a platform, the ESG manager can then predict how much storage will be consumed by a future ESG updates. Based on that determination, the ESG manager can determine how much ESG data should be stored to the dynamically adjusted ESG.

A first-received ESG download session may include the service count information and information regarding how later sessions are configured. When first-session information has been received such that it is known how many services a platform includes, then a determination may be made regarding how many days worth of ESG data should be stored.

Figure 9:
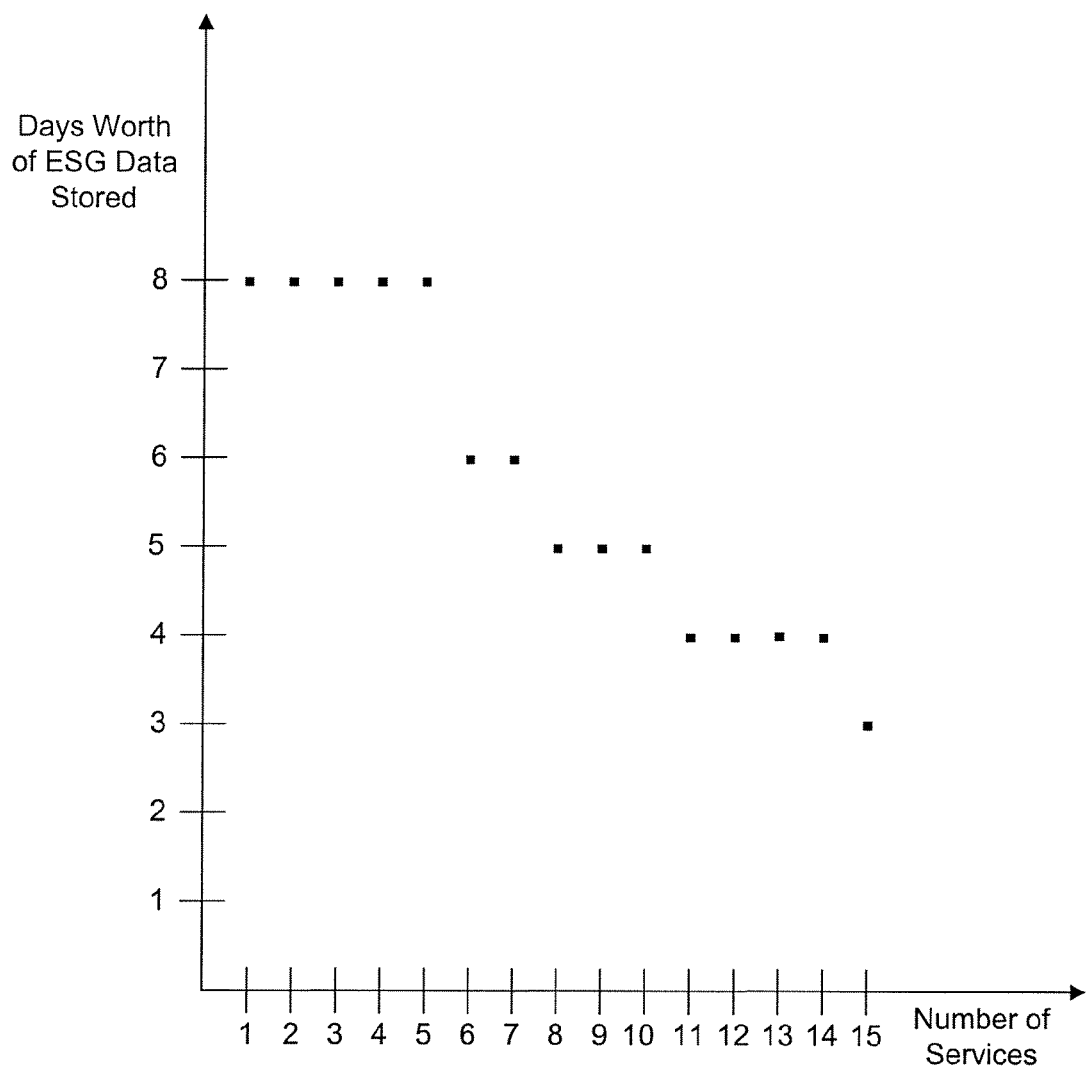
FIG. 9 is a graph showing number of days of ESG information stored versus number of services on a platform in accordance with an embodiment of the invention.

FIG. 9 is a graph showing number of days of ESG information stored versus number of services on a platform in accordance with an exemplary embodiment of the invention.

As shown in FIG. 9, For 1-5 services, 8 days of ESG information is stored in the dynamically adjusted ESG. For 6 and 7 services, 6 days of ESG information is stored in the dynamically adjusted ESG. For 8-10 services, 5 days of ESG information is stored in the dynamically adjusted ESG. For 11-14 services, 4 days of ESG information is stored in the dynamically adjusted ESG. And for 15 services or more, 3 days of ESG information is stored in the dynamically adjusted ESG.

In accordance with an embodiment of the invention, the ESG manager limits ESG size when memory available for storing ESG information is limited.

In accordance with an embodiment of the invention, disk space or memory that services take are included in the estimate of ESG storage space as follows: ESG storage space=Services*Channels/service information in days.

In accordance with an embodiment of the invention, a platform information count may be a fixed constant, which may be calculated by multiplying the number of services times the number of days for which ESG information is available. A number of days for which ESG information should be stored in the dynamically adjustable ESG may be calculated based on the platform information count. For example, if the platform information count is 50 and there are 6 services, then the number of days for which ESG information should be stored in the dynamically adjustable ESG=50/6, which results in 8 days worth of ESG information being stored (although there might be only 7 program information available, in which case 7 days worth of information would be stored).

In accordance with an embodiment of the invention, the platform information count may be a dynamically adjusted variable based on memory availability. For example, if memory available for storing the dynamically adjustable ESG goes below a threshold, the platform information count may be reduced, such as by reducing the platform information count from 50 to 40. Then, the number of days for which ESG information should be stored in the dynamically adjustable ESG=40/6, which results in 6 days worth of ESG information being stored.

Figure 10:
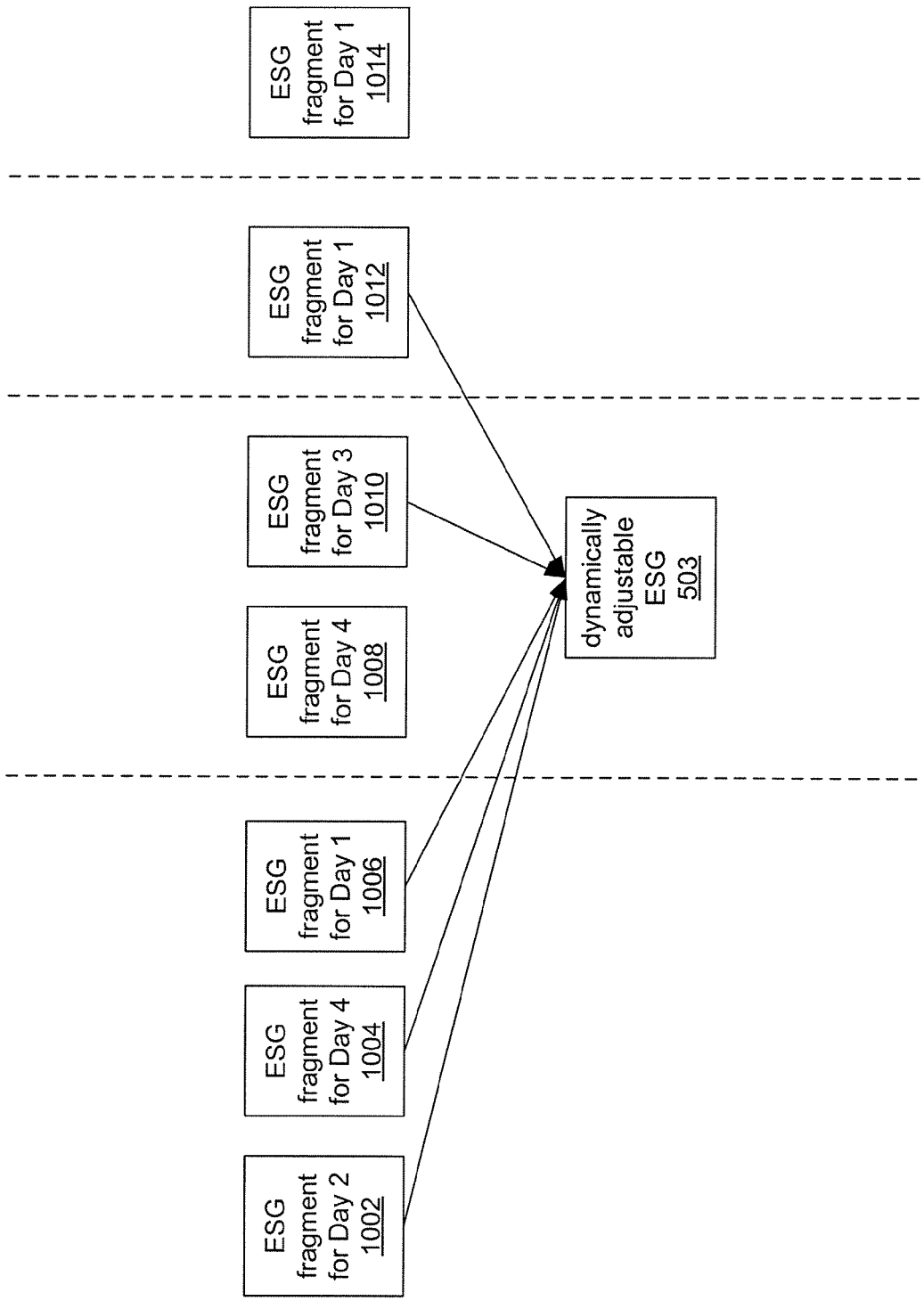
FIG. 10 is a diagram showing some ESG fragments being stored and some ESG fragments being filtered (i.e., not stored) during an ESG delivery session in accordance with a static-memory embodiment of the invention.

FIG. 10 is a diagram showing some ESG fragments being stored and some ESG fragments being filtered (i.e., not stored) during an ESG delivery session in accordance with one exemplary embodiment of the invention. ESG fragments 1002-1014 are labeled with the day to which their ESG information applies. ESG fragments 1002, 1004, 1006, 1010, and 1012 are each not filtered by the ESG manager and are, therefore, stored in the dynamically adjustable ESG 503, as indicated by the arrows in FIG. 10. ESG fragments 1008 and 1014, on the other hand, get filtered and do not get stored in the dynamically adjustable ESG.

Processing of ESG fragments and time proceed from left to right in FIG. 10. Assume that approximately 60% of fragments within an ESG delivery session have been processed when ESG fragments 1002-1006 are processed. At this stage of ESG processing, the time filter may be set to a maximum, such as 4 days, and the type filter 506 may be set such that it is not filtering any types of ESG fragments. As such, fragments 1002-1006 are neither filtered by the time filter nor the type filter and are, therefore, stored in the dynamically adjustable ESG.

After processing approximately 60% of the ESG fragments in the delivery session, assume that the ESG manager detects that a first ESG-memory-usage threshold (e.g., 80% of available ESG memory) has been exceeded. In accordance with an embodiment of the invention, the ESG manager may decrement the time filter setting to cause more ESG fragments to be filtered than before the ESG-memory-usage threshold was exceeded. For example, the time filter value may be reduced from 4 days to the 3 days.

Assume that approximately 80% of fragments within the ESG delivery session have been processed when ESG fragments 1008 and 1010 are processed. Recall that the time filter value is now 3 due to a second ESG-memory-usage threshold being exceeded. As such, fragment 1008, which contains ESG information for day 4, is filtered by the time filter and, therefore, is not stored in the dynamically adjustable ESG. Fragment 1010, on the other hand contains ESG information for day 3. Therefore, Fragment 1010 is not filtered and is stored in the dynamically adjustable ESG.

Assume that approximately 90% of fragments within the ESG delivery session have been processed when ESG fragment 1012 is processed. Fragment 1012 contains ESG information for day 1. Therefore, Fragment 1012 is not filtered and is stored in the dynamically adjustable ESG.

After processing approximately 90% of the ESG fragments in the delivery session, assume that the ESG manager detects that an ESG-memory-usage threshold (e.g., 80% of available ESG memory) has again been exceeded. In accordance with an embodiment of the invention, the ESG manager may check to see whether the time filter is already decremented to its maximum allowable value. If that's the case, the ESG manager, may then enable the type filter 506, which filters ESG fragments according to the type of ESG fragment and/or the ESG fragment's content. For example, the type filter may be set to a value of "not images," which will cause the type filter to filter ESG fragments that contain images.

Assume that approximately 99% of fragments within the ESG delivery session have been processed when ESG fragment 1014 is processed. Recall that the type filter value has been set to "not images." And assume that fragment 1014 contains an image. Therefore, fragment 1014 will be filtered by the type filter 506 and is not stored in the dynamically adjustable ESG.

The foregoing example would result in 3 days of ESG information (without images) being stored in the dynamically adjustable ESG.

B. Dynamic Memory

Information about the size of ESG fragments or a group of ESG fragments is not typically known beforehand. Fragments typically arrive in random order, and the size of one day's worth of ESG information is not typically known beforehand. Sometimes a certain size of memory can not be permanently reserved for storing ESG information because the mobile terminal may use memory for storing other types of information, including, but not limited to, images, videos, songs, and the like.

An amount of a mobile terminal's memory that is available varies with time. An ESG's size also varies with time. But, by reserving a configurable amount of ESG storage space in a mobile terminal, a mobile terminal will be able to store ESG information for a particular duration (e.g., 3 days).

An ESG manager, in accordance with an embodiment of the invention, follows a state of the mobile terminal's memory and, in case memory allocation reaches 80%, the ESG manager may cause the ESG information to be filtered from a dynamically adjustable ESG stored on the mobile terminal.

An ESG manager, in accordance with an embodiment of the invention, monitors storage capacity during ESG update operations and may cause ESG filter settings to be adjusted. For example, the timeframe (e.g., number of days) may be adjusted for which ESG fragments are currently being stored in the dynamically adjustable.

If the ESG memory usage monitor detects that a memory usage threshold (e.g., 80% ESG memory usage) has been exceeded, for example, because complete information for a selected duration (e.g. 3 days worth of ESG information) cannot be stored, various types of ESG fragments may be filtered from a dynamically adjustable ESG. For example, program descriptions, interactive services, images, and the like, may be filtered from the dynamically adjustable ESG. Various priorities may be assigned to different types of ESG data for specifying which types of ESG data should be deleted before or after other types of ESG data.

Figure 7:
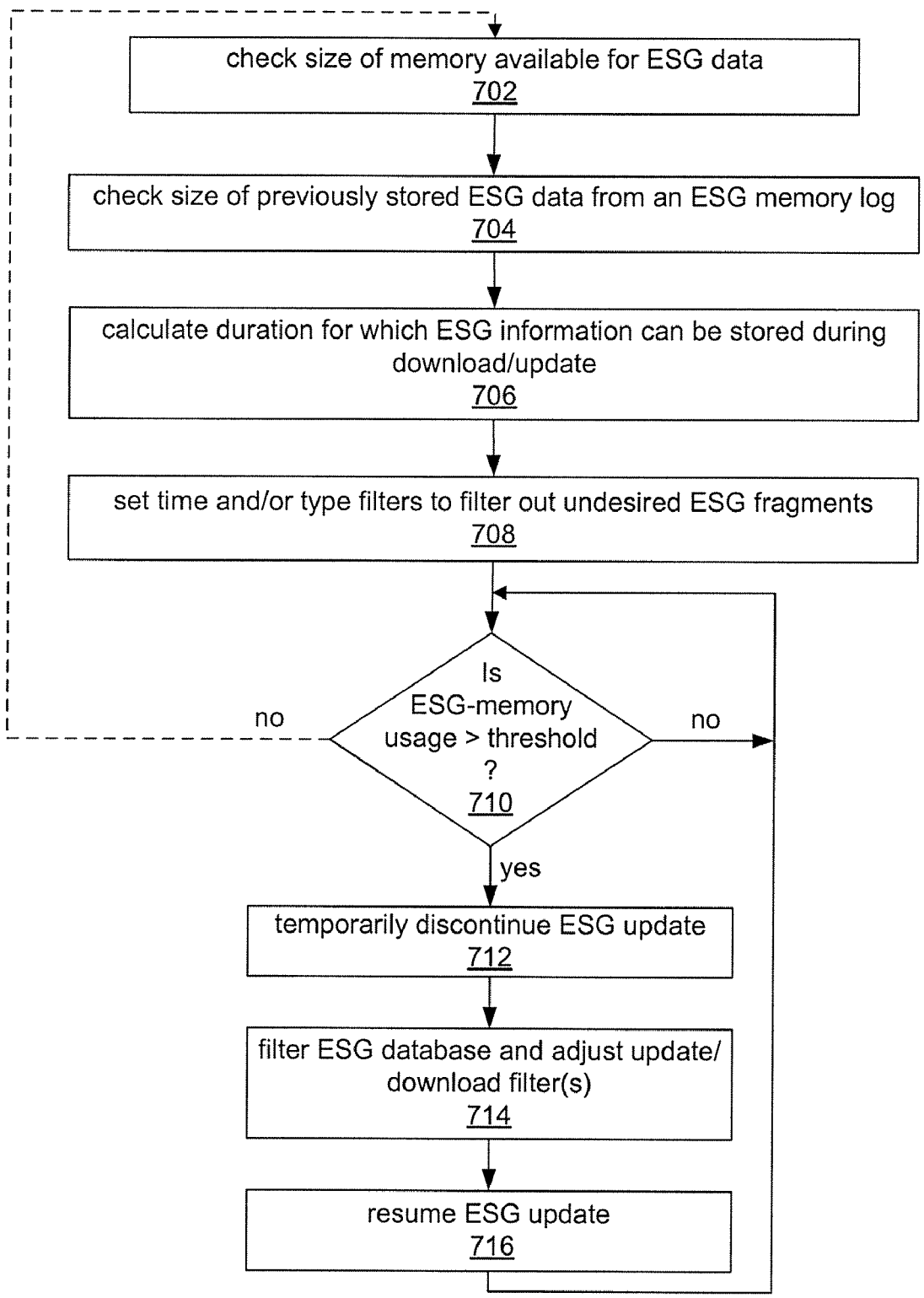
FIG. 7 shows steps performed by an ESG manager in accordance with embodiments of the invention.

FIG. 7 shows steps performed by an ESG manager in accordance with one exemplary embodiment of the invention. The first step, as shown at 702, is checking the size of memory available for storing ESG data. The next step, as shown at 704, is checking the size of previously stored ESG data from an ESG log. A duration for which ESG information can be stored during download/update is then calculated, as shown at 706. Time and/or type filters are set to filter out undesired ESG fragments, as shown at 708. While ESG fragments are being downloaded to the mobile terminal and stored in the dynamically adjustable ESG, a determination is made as to whether an ESG-memory-usage threshold (e.g., 80% of ESG memory in use) has been exceeded, as shown at 710. If the threshold has been exceeded, downloading and storing (also referred to as updating) of the dynamically adjustable ESG is temporarily discontinued, as shown at 712. ESG fragments are then filtered (i.e., removed from the dynamically adjustable ESG) and one or more update/download filters are adjusted to exclude more ESG fragments than before, during update/download of ESG fragments, from the dynamically adjustable ESG as shown at 714. Updating of the dynamically adjustable ESG then resumes, with the one or more adjusted filters, as shown at 716. Steps 710 through 716 may continue looping as long as is desired or until a minimum level of ESG data is downloaded. Alternatively, if the one or more threshold values is not reached at step 710, the method may go back to the step 702 (as shown by the dashed arrow from 710 to 702) to again check the size of the available memory, which may vary dynamically depending on general memory consumption in the device 112. The size of memory available may vary dynamically depending on a general memory consumption in the device 112. In this way, the varying ESG memory size may also be considered when calculating step 706 and defining the one or more filters in step 708. Further, it is also possible to loosen the one or more filters to store more ESG information if additional ESG memory becomes available in the user device 112. This may also be practical, because the ESG data may be continuously broadcasted, even though the ESG data may change only once in a certain time period, e.g., once per day.

Figure 11:
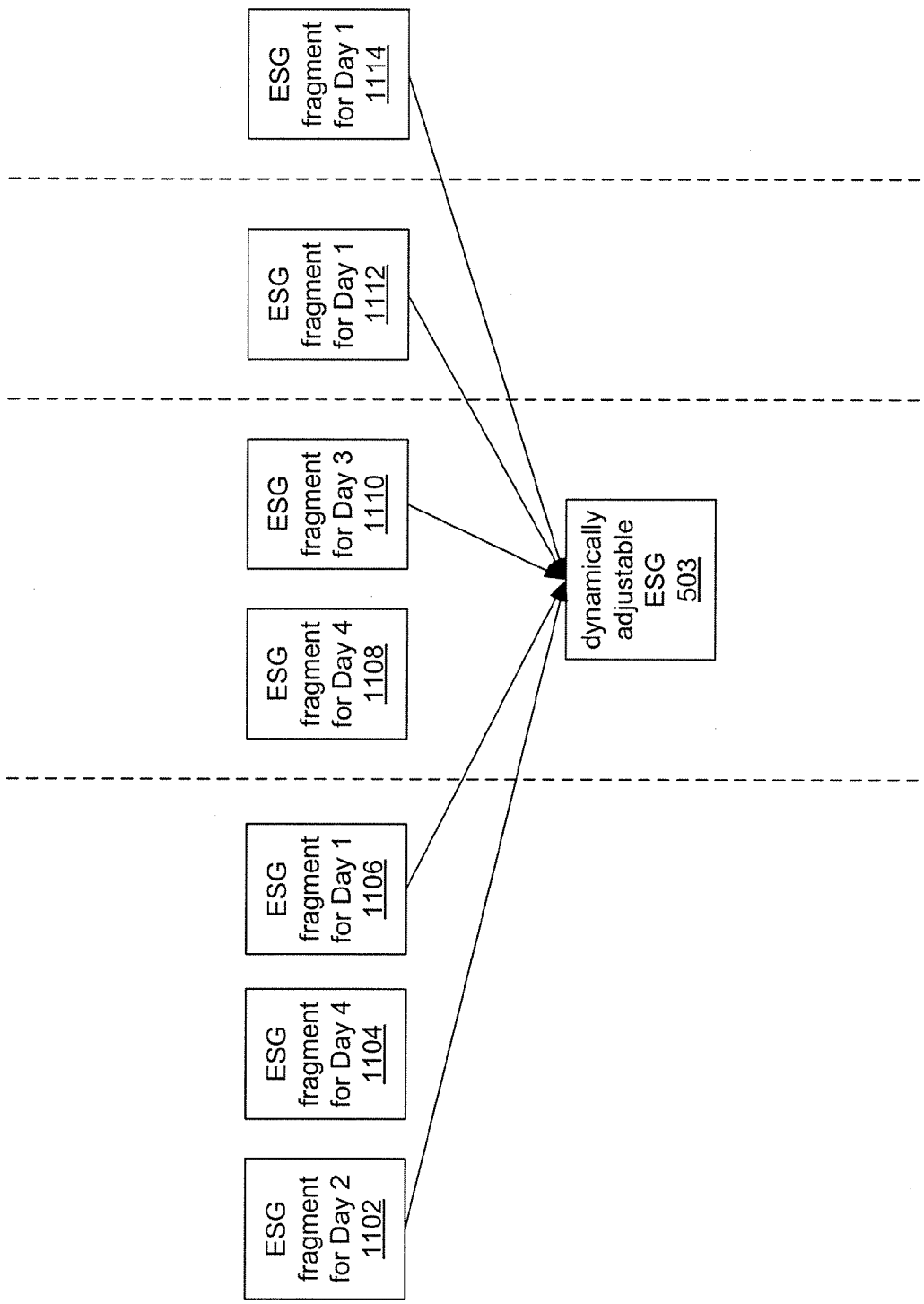
FIG. 11 is a diagram showing some ESG fragments being stored and some ESG fragments being filtered (i.e., not stored) during an ESG delivery session in accordance with a dynamic-memory embodiment of the invention.

FIG. 11 is a diagram showing some ESG fragments being stored and some ESG fragments being filtered (i.e., not stored) during an ESG delivery session in accordance with one exemplary embodiment of the invention. ESG fragments 1002-1014 are labeled with the day to which their ESG information applies. ESG fragments 1102, 1106, 1110, 1112, and 1114 are each not filtered by the ESG manager and are, therefore, stored in the dynamically adjustable ESG 503, as indicated by the arrows in FIG. 11. ESG fragments 1104 and 1108, on the other hand, get filtered and do not get stored in the dynamically adjustable ESG.

Processing of ESG fragments and time proceed from left to right in FIG. 11. Assume that, due to a lack of available user disk space, pre-analysis calculations (steps 702-708 in FIG. 7) result in a time filter value of 3 days and a type filter value of "not images." As such, ESG fragments 1104 and 1108 get filtered by the time filter 505 because ESG fragments 1104 and 1108 contain ESG information for day 4. Like the static-memory example discussed above in connection with FIG. 10, the dynamic memory example of FIG. 11 would result in 3 days of ESG information (without images) being stored in the dynamically adjustable ESG. As will be apparent, these values are used as examples and other suitable values may also be used.

C. Service Platform Size

Information about the size of fragments or groups of ESG fragments may not be known beforehand, but an estimate of ESG memory size may be generated if a platform size, such as a mobile television service platform size, is known. A mobile television service platform, for instance, defines the number of channels/services that a mobile television service provider is offering on a certain area/network/cell ID. As mentioned above, when a platform has relatively more services, ESG data for a relatively shorter period of time may be stored, and when the platform has relatively fewer services, ESG data for a relatively longer period of time may be stored. For example, suppose a platform includes ten services, then three days of ESG information may be stored in a dynamically adjustable ESG in accordance with embodiments of the invention. If, on the other hand, the platform has only five services, then six days of ESG information may be stored in a dynamically adjustable ESG in accordance with embodiments of the invention.

In accordance with an embodiment of the invention, a mobile terminal may receive information specifying a platform size, such as a mobile television platform size, and may allocate memory for ESG storage accordingly.

Figure 8:
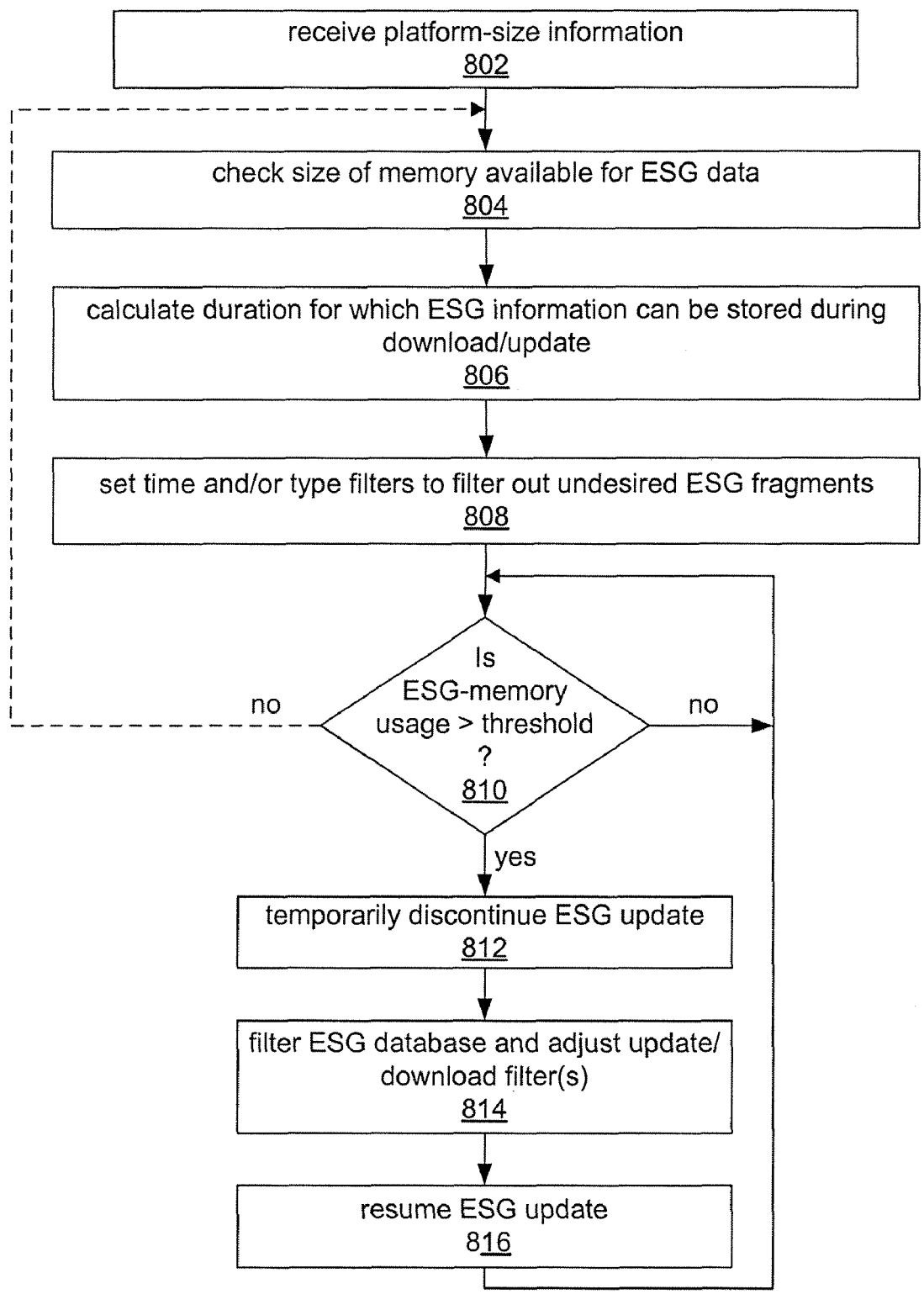
FIG. 8 shows steps performed by an ESG manager in accordance with a service-platform-size embodiment of the invention.

FIG. 8 shows steps performed by an ESG manager in accordance with one exemplary embodiment of the invention. The first step, as shown at 802, is receiving platform-size information. The platform-size information may be implemented in one or more of the ESG fragments, or in the IP/MAC Notification table by the service source 122. Alternatively, the platform-size information may be received via the cellular network 116 from the service source 122. The next step, as shown at 804, is checking the size of memory available for storing ESG data. The size of memory available may vary dynamically depending on a general memory consumption in the device 112. A duration for which ESG information can be stored during download/update is then calculated, as shown at 806. Time and/or type filters are set to filter out undesired ESG fragments, as shown at 808. While ESG fragments are being downloaded to the mobile terminal and stored in the dynamically adjustable ESG, a determination is made as to whether an ESG-memory-usage threshold (e.g., 80% of ESG memory in use) has been exceeded, as shown at 810. If the threshold has been exceeded, downloading and storing (also referred to as updating) of the dynamically adjustable ESG is temporarily discontinued, as shown at 812. ESG fragments are then filtered (i.e., removed from the dynamically adjustable ESG) and one or more update/download filters are adjusted to exclude more ESG fragments than before, during update/download of ESG fragments, from the dynamically adjustable ESG as shown at 814. Updating of the dynamically adjustable ESG then resumes, with the one or more adjusted filters, as shown at 816. Steps 810 through 816 may continue looping as long as is desired or until a minimum level of ESG data is downloaded. Alternatively, if the one or more threshold values is not reached at step 810 the method may go back to the step 804 (as shown by the dashed arrow from 810 to 804) to check the size of the available memory again. In this way, the varying ESG memory size may also be considered when calculating step 806 and defining the one or more filters in step 808. Further, it is also possible to loosen the one or more filters to store more ESG information if additional ESG memory becomes available in the user device 112. This may also be practical, because the ESG data may be continuously broadcasted, even though the ESG data may change only once in a certain time period, e.g., once per day.

What has been described above is merely illustrative of the application of the principles of the invention. Those skilled in the art can implement other arrangements and methods without departing from the spirit and scope of the invention. Any combination of the embodiments of the invention is possible. Any combination and order of method steps presented in FIGS. 6, 7, and 8 is possible. Any of the methods of the invention can be implemented in software that can be stored on computer disks or other computer-readable media.

We claim:

1. A method comprising:
   while receiving electronic-service-guide data in a delivery session, dynamically allocating mobile-terminal electronic-service-guide memory by a processor and storing fragments of the electronic-service-guide data in the memory, according to a plurality of increasing processed percentages of the electronic-service-guide data and at least one memory usage threshold in the delivery session by:
   determining a first composition of fragments of the electronic-service-guide data that are either stored or to be stored in the allocated mobile-terminal electronic-service-guide memory after reaching a first processed percentage of the electronic-service-guide data and the at least one memory usage threshold while receiving electronic-service-guide data, wherein said determining includes selecting at least one of a first time-filter value and a type-filter value based on a first current memory usage and a first number of services to be supported by the first composition; and
   applying the selected at least one of the first time-filter value and the type-filter value on electronic-service-guide fragments to be stored in the memory, to be deleted from the memory, or a combination thereof.

2. The method of claim 1, further comprising:
   determining a second composition of fragments of the electronic-service-guide data that are either stored or to be stored in the allocated mobile-terminal electronic-service-guide memory after reaching a second processed percentage of the electronic-service-guide data and the at least one or a different memory usage threshold while receiving electronic-service-guide data, wherein the second processed percentage is bigger than the first processed percentage, said determining includes selecting at least one of a second time-filter value and a type-filter value based on a second current memory usage and a second number of services to be supported by the second composition; and
   applying the selected at least one of the second time-filter value and the type-filter value on electronic-service-guide fragments to be stored in the memory, to be deleted from the memory, or a combination thereof, wherein the second time-filter value is smaller than the first time-filter value.

3. The method of claim 2, further comprising:
   determining a third composition of fragments of the electronic-service-guide data that is either stored or to be stored in the allocated mobile-terminal electronic-service-guide memory after reaching a third processed percentage of the electronic-service-guide data and the at least one or a different memory usage threshold while receiving electronic-service-guide data, the third processed percentage being bigger than the second processed percentage, wherein said determining includes selecting at least one of a third time-filter value and a type-filter value based on a third current memory usage and a third number of services to be supported by the third composition, for which electronic-service-guide fragments are stored in the memory; and
   applying the at least one of the third time-filter value and the type-filter value on electronic-service-guide fragments to be stored in the memory, to be deleted from the memory, or a combination thereof, wherein the third time-filter value is smaller than the second time-filter value.

4. The method of claim 1, further comprising determining a size of the allocated electronic-service-guide memory.

5. The method of claim 4, further comprising: determining a size of the allocated electronic-service-guide memory based on an amount of memory dynamically changing to become available in a mobile terminal during the delivery session.

6. The method of claim 4, further comprising: determining a size of the allocated electronic-service-guide memory by checking statistics of previously stored and/or received electronic-service-guide data.

7. The method of claim 2, wherein the time-filter value is determined based on whether the corresponding memory usage threshold has been exceeded.

8. The method of claim 1, wherein one or more types of fragments of the electronic-service-guide data are determined to be stored in the memory.

9. The method of claim 1, wherein a number of days of fragments of the electronic-service-guide data are determined to be deleted from the memory based upon a time-filter value.

10. The method of claim 1, wherein some stored fragments of the electronic-service-guide data are determined to be deleted from the memory.

11. A method comprising:
    in response to an amount of electronic-service-guide data memory dynamically changing to become available in a mobile terminal during a current delivery session:
    checking a size of previously stored electronic-service-guide data in a previous delivery session and a size of stored electronic-service-guide data in the current delivery session;
    estimating a time-filter value to determine whether to store incoming electronic-service-guide data in the memory, wherein the time-filter value is determined based on a number of services for which fragments of the electronic-service-guide data are to be stored in the memory;
    estimating a type-filter value to determine whether to store the incoming electronic-service-guide data in the memory; and
    determining a composition of fragments of electronic-service-guide data to be stored in the memory, to be deleted from the memory, or a combination thereof, according to the estimated time-filter and type-filter values,
    wherein the time-filter and type-filter values are estimated by a processor according to at least one memory usage threshold of the dynamically changing electronic-service-guide data memory and a corresponding one of increasing processed percentages of the electronic-service-guide data in the current delivery session.

12. The method of claim 11, wherein the time-filter value is determined based on whether the memory usage threshold has been exceeded.

13. The method of claim 11, further comprising: determining a size of an available mobile-terminal electronic-service-guide memory to store the memory.

14. The method of claim 11, wherein a number of days of applicable electronic-service-guide fragments are determined to be deleted from the memory based upon the time-filter value.

15. The method of claim 11, wherein one or more types of fragments of the electronic-service-guide data are stored in the memory.

16. An apparatus comprising:
at least one processor; and
at least one memory including computer program code for one or more programs,
the at least one memory and the computer program code configured to, with the at least one processor, cause the apparatus to perform at least the following,
while receiving electronic-service-guide data in a delivery session, dynamically allocate mobile-terminal electronic-service-guide memory and store fragments of the electronic-service-guide data in the memory, according to a plurality of increasing processed percentages of the electronic-service-guide data and at least one memory usage threshold in the delivery session by:
determining a first composition of fragments of the electronic-service-guide data that are either stored or to be stored in the allocated mobile-terminal electronic-service-guide memory after reaching a first processed percentage of the electronic-service-guide data and the at least one memory usage threshold while receiving electronic-service-guide data, wherein said determining includes selecting at least one of a first time-filter value and a type-filter value based on a first current memory usage and a first number of services to be supported by the first composition; and
applying the selected at least one of the first time-filter value and the type-filter value on electronic-service-guide fragments to be stored in the memory, to be deleted from the memory, or a combination thereof.

17. The apparatus of claim 16, wherein the apparatus is further caused to:
determine a second composition of fragments of the electronic-service-guide data that are either stored or to be stored in the allocated mobile-terminal electronic-service-guide memory after reaching a second processed percentage of the electronic-service-guide data and the at least one or a different memory usage threshold while receiving electronic-service-guide data, wherein the second processed percentage is bigger than the first processed percentage, said determining includes selecting at least one of a second time-filter value and a type-filter value based on a second current memory usage and a second number of services to be supported by the second composition; and
apply the selected at least one of the second time-filter value and the type-filter value on electronic-service-guide fragments to be stored in the memory, to be deleted from the memory, or a combination thereof, wherein the second time-filter value is smaller than the first time-filter value.

18. The apparatus of claim 17, wherein the apparatus is further caused to:
determine a third composition of fragments of the electronic-service-guide data that is either stored or to be stored in the allocated mobile-terminal electronic-service-guide memory after reaching a third processed percentage of the electronic-service-guide data and the at least one or a different memory usage threshold while receiving electronic-service-guide data, the third processed percentage being bigger than the second processed percentage, wherein said determining includes selecting at least one of a third time-filter value and a type-filter value based on a third current memory usage and a third number of services to be supported by the third composition, for which electronic-service-guide fragments are stored in the memory; and
apply the at least one of the third time-filter value and the type-filter value on electronic-service-guide fragments to be stored in the memory, to be deleted from the memory, or a combination thereof, wherein the third time-filter value is smaller than the second time-filter value.

19. An apparatus comprising:
at least one processor; and
at least one memory including computer program code for one or more programs,
the at least one memory and the computer program code configured to, with the at least one processor, cause the apparatus to perform at least the following,
in response to an amount of electronic-service-guide data memory dynamically changing to become available in a mobile terminal during a current delivery session:
check a size of previously stored electronic-service-guide data in a previous delivery session and a size of stored electronic-service-guide data in the current delivery session;
estimate a time-filter value to determine whether to store incoming electronic-service-guide data in the memory, wherein the time-filter value is determined based on a number of services for which fragments of the electronic-service-guide data are to be stored in the memory;
estimate a type-filter value to determine whether to store the incoming electronic-service-guide data in the memory; and
determine a composition of fragments of electronic-service-guide data to be stored in the memory, to be deleted from the memory, or a combination thereof, according to the estimated time-filter and type-filter values,
wherein the time-filter and type-filter values are estimated according to at least one memory usage threshold of the dynamically changing electronic-service-guide data memory and a corresponding one of increasing processed percentages of the electronic-service-guide data in the current delivery session.

20. The method of claim 5, wherein the at least one memory usage threshold is defined as a percentage of the dynamically changing electronic-service-guide memory.

21. The method of claim 5, further comprising:
in response to increased memory, de-selecting at least one of the time-filter value and the type-filter value.

22. The method of claim 5, wherein the second composition are different from the first composition due to the at least one of the first time-filter and type-filter values, the at least one of the second time-filter and type-filter values, the first and second numbers of services, the dynamically changing electronic-service-guide memory, or a combination thereof.

23. The method of claim 1, further comprising:
assigning filtering priorities to a plurality of type-filter values corresponding to different types of electronic-service-guide data; and deploying the type-filters based upon the filtering priorities and the increasing processed percentages of the electronic-service-guide data.

24. The method of claim 23, wherein the types of electronic-service-guide data include a program description, interactive service, image, or combination thereof.

25. A computer-readable non-transitory storage medium carrying one or more sequences of one or more instructions which, when executed by one or more processors, cause an apparatus to at least perform the following steps:

while receiving electronic-service-guide data in a delivery session, dynamically allocating mobile-terminal electronic-service-guide memory and store fragments of the electronic-service-guide data in the memory, according to a plurality of increasing processed percentages of the electronic-service-guide data and at least one memory usage threshold in the delivery session by:

determining a first composition of fragments of the electronic-service-guide data that are either stored or to be stored in the allocated mobile-terminal electronic-service-guide memory after reaching a first processed percentage of the electronic-service-guide data and the at least one memory usage threshold while receiving electronic-service-guide data, wherein said determining includes selecting at least one of a first time-filter value and a type-filter value based on a first current memory usage and a first number of services to be supported by the first composition; and applying the selected at least one of the first time-filter value and the type-filter value on electronic-service-guide fragments to be stored in the memory, to be deleted from the memory, or a combination thereof.

26. The computer-readable non-transitory storage medium of claim 25, wherein the apparatus is caused to further perform:

determining a second composition of fragments of the electronic-service-guide data that are either stored or to be stored in the allocated mobile-terminal electronic-service-guide memory after reaching a second processed percentage of the electronic-service-guide data and the at least one or a different memory usage threshold while receiving electronic-service-guide data, wherein the second processed percentage is bigger than the first processed percentage, said determining includes selecting at least one of a second time-filter value and a type-filter value based on a second current memory usage and a second number of services to be supported by the second composition; and applying the selected at least one of the second time-filter value and the type-filter value on electronic-service-guide fragments to be stored in the memory, to be deleted from the memory, or a combination thereof, wherein the second time-filter value is smaller than the first time-filter value.

27. The computer-readable non-transitory storage medium of claim 25, wherein the apparatus is caused to further perform:

determining a third composition of fragments of the electronic-service-guide data that is either stored or to be stored in the allocated mobile-terminal electronic-service-guide memory after reaching a third processed percentage of the electronic-service-guide data and the at least one or a different memory usage threshold while receiving electronic-service-guide data, the third processed percentage being bigger than the second processed percentage, wherein said determining includes selecting at least one of a third time-filter value and a type-filter value based on a third current memory usage and a third number of services to be supported by the third composition, for which electronic-service-guide fragments are stored in the memory; and applying the at least one of the third time-filter value and the type-filter value on electronic-service-guide fragments to be stored in the memory, to be deleted from the memory, or a combination thereof, wherein the third time-filter value is smaller than the second time-filter value.

28. The method of claim 11, wherein the at least one memory usage threshold is defined as a percentage of the dynamically changing electronic-service-guide memory.

29. The method of claim 11, further comprising:
in response to increased memory, de-selecting at least one of the time-filter value and the type-filter value.

30. The method of claim 11,
assigning filtering priorities to a plurality of type-filter values corresponding to different types of electronic-service-guide data; and
deploying the type-filters based upon the filtering priorities and the increasing processed percentages of the electronic-service-guide data.

31. The method of claim 30, wherein the types of electronic-service-guide data include a program description, interactive service, image, or combination thereof.

32. The apparatus of claim 19, wherein the at least one memory usage threshold is defined as a percentage of the dynamically changing electronic-service-guide memory.

33. A computer-readable non-transitory storage medium carrying one or more sequences of one or more instructions which, when executed by one or more processors, cause an apparatus to at least perform the following steps:

in response to an amount of electronic-service-guide data memory dynamically changing to become available in a mobile terminal during a current delivery session:
checking a size of previously stored electronic-service-guide data in a previous delivery session and a size of stored electronic-service-guide data in the current delivery session;
estimating a time-filter value to determine whether to store incoming electronic-service-guide data in the memory, wherein the time-filter value is determined based on a number of services for which fragments of the electronic-service-guide data are to be stored in the memory;
estimating a type-filter value to determine whether to store the incoming electronic-service-guide data in the memory; and
determining a composition of fragments of electronic-service-guide data to be stored in the memory, to be deleted from the memory, or a combination thereof, according to the estimated time-filter and type-filter values,
wherein the time-filter and type-filter values are estimated according to at least one memory usage threshold of the dynamically changing electronic-service-guide data memory and a corresponding one of increasing processed percentages of the electronic-service-guide data in the current delivery session.

34. The computer-readable non-transitory storage medium of claim 33, wherein the at least one memory usage threshold is defined as a percentage of the dynamically changing electronic-service-guide memory.

* * * * *